United States Patent
Pasupuleti et al.

(10) Patent No.: US 9,854,510 B2
(45) Date of Patent: *Dec. 26, 2017

(54) DYNAMIC AGGRESSION MANAGEMENT OF CELLULAR CONNECTIVITY

(71) Applicant: Apple Inc., Cupertino, CA (US)

(72) Inventors: Srinivas Pasupuleti, San Jose, CA (US); Sriram Venkataramanan, Santa Clara, CA (US); Someet K. Lal, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/204,246

(22) Filed: Jul. 7, 2016

(65) Prior Publication Data
US 2016/0353364 A1    Dec. 1, 2016

Related U.S. Application Data

(63) Continuation of application No. 14/724,873, filed on May 29, 2015, now Pat. No. 9,414,298.

(51) Int. Cl.
| | | |
|---|---|---|
| *H04W 48/16* | (2009.01) | |
| *H04W 48/02* | (2009.01) | |
| *H04W 52/02* | (2009.01) | |
| *H04W 8/18* | (2009.01) | |
| *H04W 24/00* | (2009.01) | |
| *H04W 28/02* | (2009.01) | |
| *H04W 76/00* | (2009.01) | |
| *H04W 48/06* | (2009.01) | |
| *H04W 60/00* | (2009.01) | |

(Continued)

(52) U.S. Cl.
CPC ............ *H04W 48/16* (2013.01); *H04W 8/18* (2013.01); *H04W 24/00* (2013.01); *H04W 28/02* (2013.01); *H04W 48/02* (2013.01); *H04W 48/06* (2013.01); *H04W 52/0209* (2013.01); *H04W 52/0251* (2013.01); *H04W 52/0261* (2013.01); *H04W 60/00* (2013.01); *H04W 74/0833* (2013.01); *H04W 76/00* (2013.01); *H04W 28/18* (2013.01); *Y02B 60/50* (2013.01)

(58) Field of Classification Search
CPC ..................................................... H04W 48/16
USPC .............................. 455/434–435.2
See application file for complete search history.

(56) References Cited

U.S. PATENT DOCUMENTS

| | | |
|---|---|---|
| 7,949,377 B2 | 5/2011 | Islam et al. |
| 8,718,644 B2 | 5/2014 | Thomas et al. |
| 9,210,627 B1 | 12/2015 | Rao et al. |

(Continued)

*Primary Examiner* — Michael T Vu
(74) *Attorney, Agent, or Firm* — Meyertons Hood Kivlin Kowert & Goetzel, P.C.; Jeffrey C. Hood

(57) ABSTRACT

This disclosure relates to techniques for dynamic selection of connection attempt throttling algorithms based on user context. According to some embodiments, a wireless device may monitor certain current conditions of the UE, such as battery level, user activity level, motion level, and/or other conditions. Depending at least in part on the current conditions of the UE, cellular connection attempt parameters may be selected. In some conditions the cellular connection attempt parameters may be selected such as to allow more aggressive pursuit of cellular connectivity, while in other conditions the cellular connection attempt parameters may be selected such as to allow less aggressive pursuit of cellular connectivity.

20 Claims, 12 Drawing Sheets

(51) Int. Cl.
*H04W 74/08* (2009.01)
*H04W 28/18* (2009.01)

(56) References Cited

U.S. PATENT DOCUMENTS

| | | | |
|---|---|---|---|
| 2006/0039309 A1* | 2/2006 | Lee | H04W 72/005 |
| | | | 370/312 |
| 2012/0289230 A1* | 11/2012 | Uno | H04W 36/14 |
| | | | 455/435.2 |
| 2014/0194086 A1 | 7/2014 | Alam et al. | |
| 2014/0274095 A1 | 9/2014 | Saito | |
| 2014/0333145 A1 | 11/2014 | Lee et al. | |
| 2015/0109918 A1 | 4/2015 | Sharma et al. | |

* cited by examiner

UE Power Characteristics:

1. Battery Level
2. Channel Conditions
3. Device Thermal Conditions
4. Uplink Interference/Network Congestion User Activities:

1. Screen On or Off
2. Stationary or Moving
3. Foreground or Background Application Data Cell Information:

1. PLMN
2. Cell ID
3. Radio Access Technology

| Threshold / Algorithms | Description | Values |
| --- | --- | --- |
| T1 | Number of Failed Data Service Requests | $1 \leq T1 \leq 5$ |
| T2 | Time to Throttle Data Requests in seconds | $720s \leq T2 \leq 1440s$ |
| T3 | Number of Failed Consecutive RRC connection attempts for registration purposes (Attach, LU, TAU etc) | $2 \leq T3 \leq 6$ |
| T4 | Number of Failed RACH Preamble Cycles or RACH attempts at MAC Layer for one RRC Connection Request with cause = registration | $1 \leq T4 \leq 12$ |
| T5 | Total Number of RRC Connection Attempt failures seen per cell | $12 \leq T5 \leq 48$ |
| T6 | Number of times OOS declared per cell | $1 \leq T6 \leq 4$ |
| T7 | Number of Failed RACH Preamble Cycles or RACH attempts at MAC Layer for one RRC Connection Request with cause = MO Data | $1 \leq T7 \leq 12$ |
| T8 | Bar Timer used based on the type of algorithm chosen (A1/A2/A3) | $720s \leq T8 \leq 1440s$ |

| A1 | Bar cell identified by unique global cell ID |
| --- | --- |
| A2 | Bar Frequency identified by UARFCN/EARFCN for UMTS/LTE |
| A3 | Disable current active Radio Access Technology (RAT) |

FIG. 12

| Band | Frequency | PCS | Total RRC Failure | Total OOS |
|---|---|---|---|---|
| Band V | 4360 | 4 | 24 | 2 |
| | 4360 | 409 | 24 | 2 |
| | 4360 | 199 | 24 | 2 |
| | 4360 | 20 | 24 | 2 |
| | 4385 | 170 | 24 | 2 |
| | 4385 | 20 | 24 | 2 |
| | 4385 | 193 | 24 | 2 |
| Band II | 612 | 120 | 24 | 2 |
| | 612 | 306 | 24 | 2 |

All the PSC's have to meet
RRC Failure – 24
OOS Counter - 2

| Band | Frequency | PCS | Total RRC Failure | Total OOS |
|---|---|---|---|---|
| Band V | 4360 | PSC – 4, 409, 199, 20 | 24 | 2 |
| | 4385 | PSC – 170, 20, 193 | 24 | 2 |
| Band II | 612 | PSC 120, 306 | 24 | 2 |

Only 3 UARFCN are screened for
RRC Failure – 24
OOS Counter - 2

DYNAMIC AGGRESSION MANAGEMENT OF CELLULAR CONNECTIVITY

PRIORITY

This application is a continuation of U.S. patent application Ser. No. 14/724,873 titled "Dynamic Aggression Management of Cellular Connectivity" filed May 29, 2015, whose inventors are Srinivas Pasupuleti, Sriram Venkataramanan, and Someet K. Lal, which is hereby incorporated by reference in its entirety as though fully and completely set forth herein.

FIELD

The present application relates to wireless devices, including to apparatuses, systems, and methods for a wireless device to dynamically modify how aggressively to attempt to obtain cellular connectivity under different circumstances.

DESCRIPTION OF THE RELATED ART

Wireless communication systems are rapidly growing in usage. Further, wireless communication technology has evolved from voice-only communications to also include the transmission of data, such as Internet and multimedia content. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others. The availability and quality of wireless service may be variable; it is possible that a wireless device may on some occasions have difficulty obtaining service or lose service (e.g., be unable to detect and/or receive signals) from their service provider.

Particularly for battery powered devices, power consumption is an important consideration: users generally prefer devices which exhibit longer battery life. However, it is common, even for battery powered wireless devices, for the aggressiveness with which connectivity is pursued (e.g., in circumstances when service is unavailable or difficult to obtain) to be static, such that battery power levels or other variable conditions are not considered. Accordingly, improvements in the field would be desirable.

SUMMARY

Embodiments are presented herein of apparatuses, systems, and methods for wireless devices to dynamically modify how aggressively to attempt to obtain cellular connectivity under different circumstances.

According to the techniques described herein, a wireless device may attempt to obtain cellular connectivity in certain circumstances, such as in order to service a data request received from an application layer of the wireless device. At least some of the parameters used in conjunction with such attempts to connect to a cellular network may differ depending on certain conditions, potentially including battery level, user activity level, and/or other conditions. For example, certain parameters may be modified to be less aggressive in pursuing connectivity when battery level and user activity level are both low, and more aggressive in pursuing connectivity when battery level and user activity level are both high.

The parameters which may differ depending on the conditions may include any of a variety of parameters, which may apply at various operating layers. Some possibilities of connectivity related parameters could include a type of barring (cell/frequency) used if cell registration failure occurs, a threshold number of radio resource control (RRC) connection attempt failures to cause cell registration failure, a threshold number of cell registration failures to cause disabling of one or more radio access technologies (RATs), a length of time for which one or more RATs are disabled if such disabling is triggered, a threshold number of cell registration failures to cause data request failure, a threshold number of data request servicing failures to cause throttling of application data requests, a length of time for which application data requests are throttled if such throttling is triggered, or any of various other possible parameters.

The techniques described herein may be implemented in and/or used with a number of different types of devices, including but not limited to cellular phones, tablet computers, wearable computing devices, portable media players, cellular network infrastructure equipment, servers, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which:

FIGS. 7-12 are flowchart diagrams illustrating example connection attempt procedures, associated parameters, and parameter selection algorithms, according to some embodiments.

Figure 1:
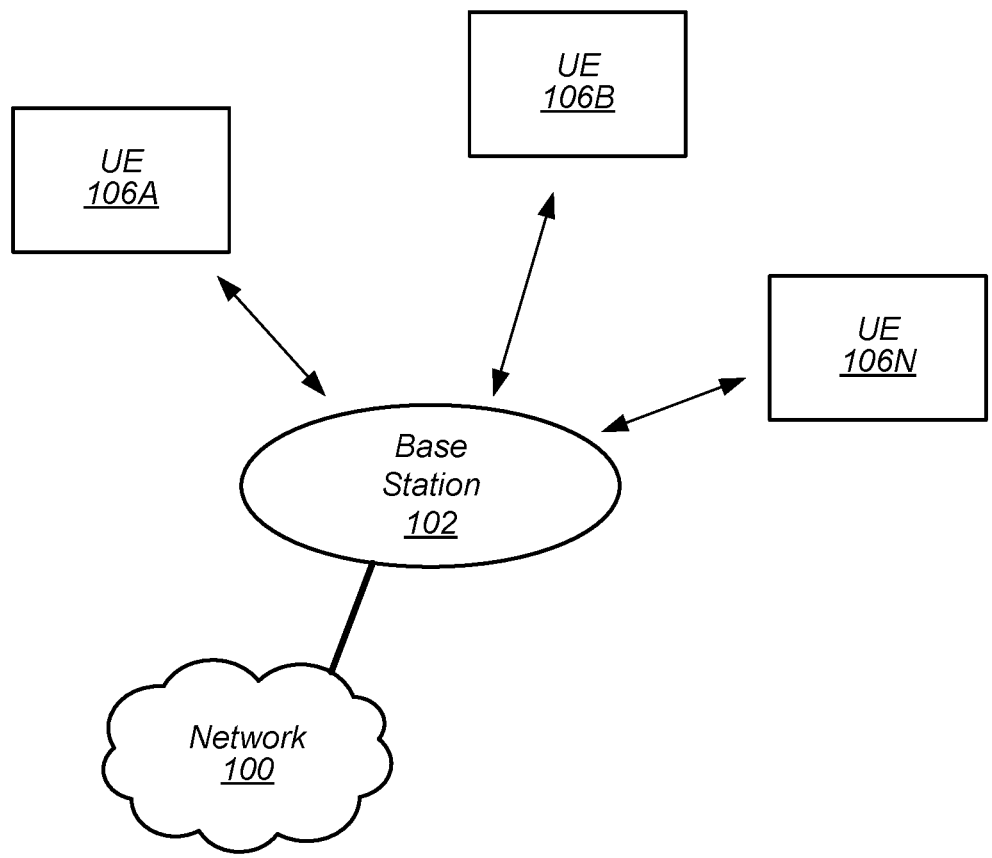
FIG. 1 illustrates an exemplary (and simplified) wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure:
UE: User Equipment
BS: Base Station
RAT: Radio Access Technology
3GPP: Third Generation Partnership Project
3GPP2: Third Generation Partnership Project 2
GSM: Global System for Mobile Communication
UMTS: Universal Mobile Telecommunication System
LTE: Long Term Evolution
RACH: Random Access Procedure
RNTI: Radio Network Temporary Identifier
RA-RNTI: Random Access RNTI
C-RNTI: Cell RNTI
TC-RNTI: Temporary Cell RNTI
TMSI: Temporary Mobile Subscriber Identity
S-TMSI: System Architecture Evolution TMSI

TERMS

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Cell—The term "cell" as used herein may refer to an area in which wireless communication services are provided on a radio frequency by a cell site or base station. A cell may be identified in various instances by the frequency on which the cell is deployed, by a network (e.g., PLMN) to which the cell belongs, and/or a cell identifier (cell id), among various possibilities.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
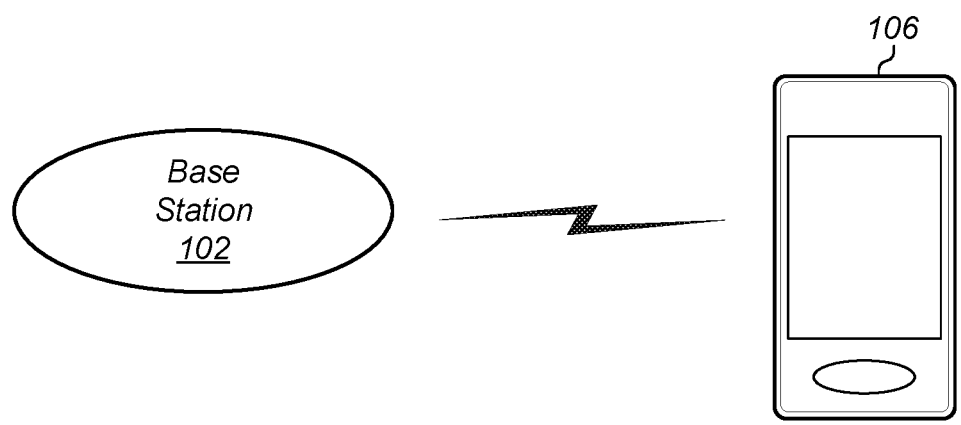
FIG. 2 illustrates an exemplary base station (BS) in communication with an exemplary wireless user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments of the disclosure may be implemented in any of various systems, as desired.

As shown, the exemplary wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with the UEs 106A through 106N. If the base station 102 is implemented in the context of LTE, it may alternately be referred to as an 'eNodeB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100.

The communication area (or coverage area) of the base station may be referred to as a "cell." The base station 102 and the UEs 106 may be configured to communicate over the transmission medium using any of various radio access technologies (RATs), wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple RATs. For example, the UE 106 may be configured to communicate using two or more of GSM, UMTS, CDMA2000, LTE, LTE-A, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
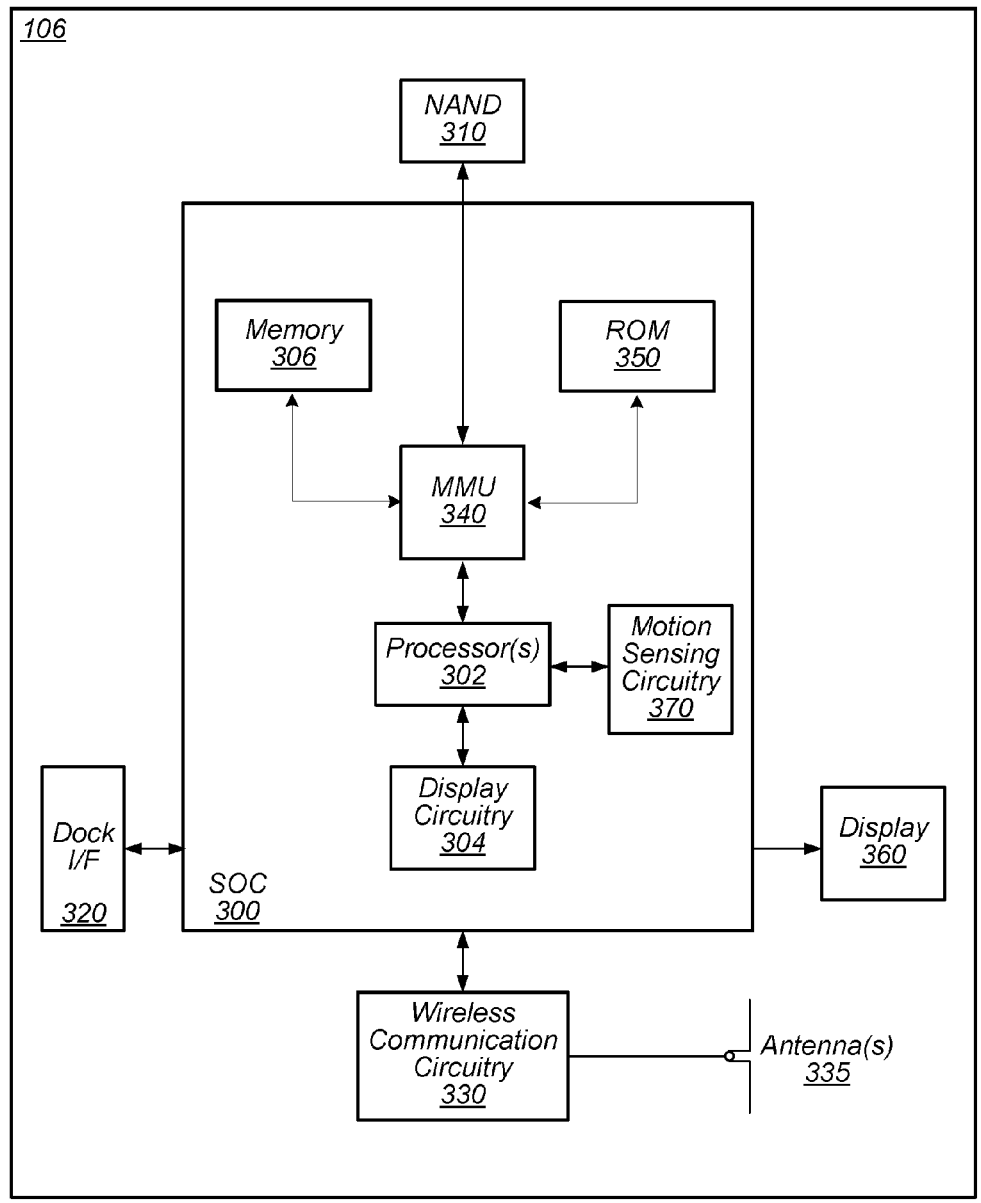
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

As noted above, the UE 106 may be configured to communicate wirelessly using multiple wireless communication technologies. As further noted above, in such instances, the wireless communication circuitry 330 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 335 to perform the wireless communication.

As described further subsequently herein, the UE 106 may include hardware and software components for implementing features for dynamically modifying connection attempt aggressiveness, such as those described herein with reference to, inter alia, FIG. 5. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 5.

Figure 4:
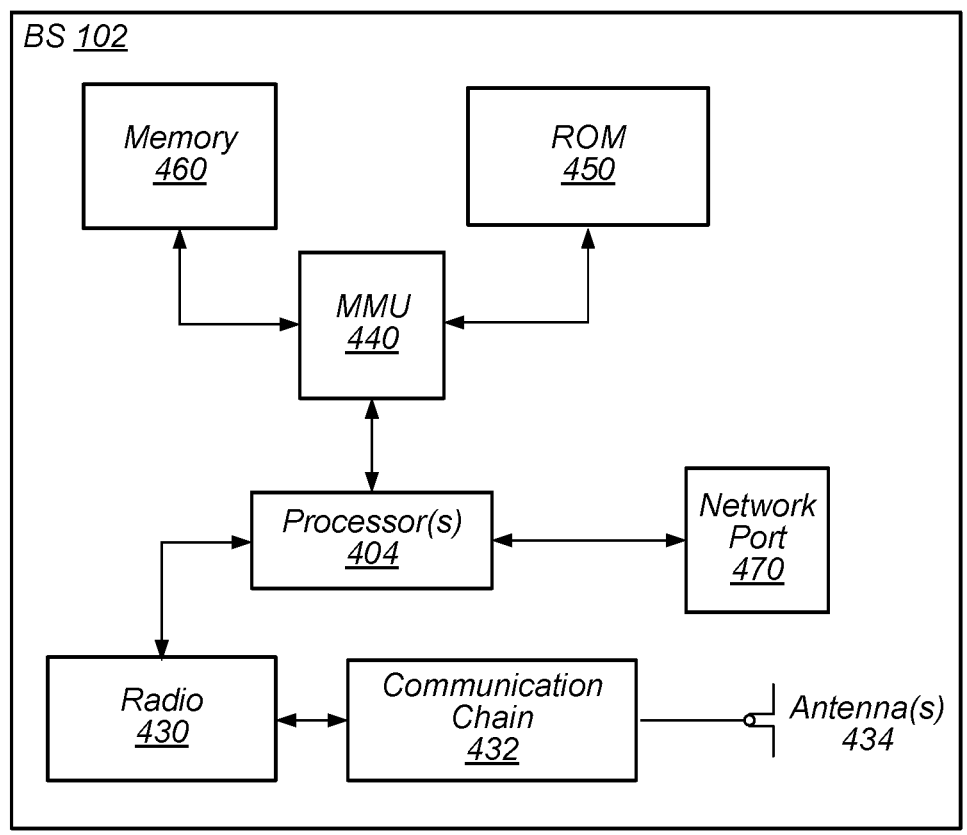
FIG. 4 illustrates an exemplary block diagram of a BS, according to some embodiments.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

FIG. 5—Flowchart

Figure 5:
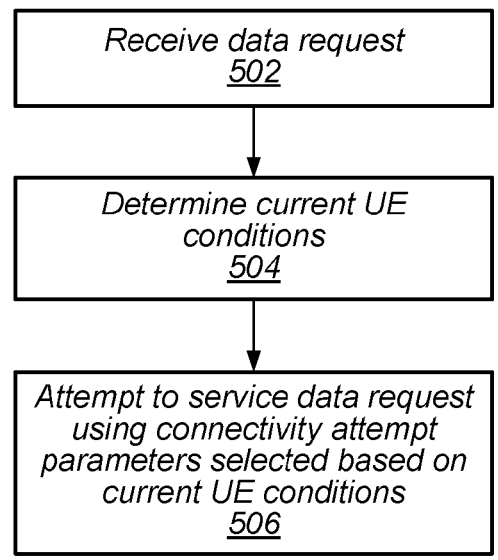
FIG. 5 is a flowchart diagram illustrating an exemplary method for a UE to dynamically select connection attempt aggressiveness, according to some embodiments.

FIG. 5 is a flowchart diagram illustrating a method for a wireless device (e.g., a wireless user equipment (UE) device such as illustrated and described with respect to FIGS. 1-3) to dynamically modify the aggressiveness with which a cellular connection is pursued in different conditions. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, a data request may be received. The data request may be an application layer data request, which may be received by a baseband layer of the UE device. For example, the data request may be a request from an application to communicate data by way of a cellular network interface of the wireless device on behalf of the application. The data request may be for background data or foreground data. The application may be an application of any of various possible application types, such as a web browser application, an email application, a productivity application, a gaming application, an e-commerce application, and/or any of various other possible application types.

In 504, current UE conditions may be determined. The UE conditions may relate to any of various possible aspects of UE operation. One possible UE condition may relate to a battery level of the UE device. For example, any number of different battery levels, e.g., corresponding to different battery level thresholds, may be defined, and a current battery level or state of the UE device may be one possible condition of the UE device that is determined.

Another possible condition may include a user activity level of the UE device. One or more user activity indicators may be monitored to determine the user activity level of the UE device. For example, a display status may be an indicator of user activity: if the display is on, this may be an indication of a higher user activity level (e.g., one or more foreground apps may be running), while if the display is off (or on because of a notification rather than user activity), this may be an indication of a lower user activity level. Thus, according to this example, if the display status of the UE is off, it may be determined that the UE device has a low user activity level, while if the display status of the UE is on, it may be determined that the UE device has a high user activity level. Note that any number of user activity levels or states may be defined, and that any number of user activity indicators may be used additionally or alternatively to the display status of the UE to determine the user activity level of the UE, according to various embodiments.

A still further condition may include a motion level of the UE device. The motion level of the UE 106 may be either 'stationary' or 'non-stationary', as two possibilities. For example, if motion above a motion threshold is detected, the UE 106 may be determined to be non-stationary, while if motion detected is below the motion threshold, the UE 106 may be determined to be stationary. Other (e.g., intermediate) levels or states of motion may be defined if desired. At least in some instances, the motion detection may be performed by motion sensing circuitry of the UE. For example, the UE may include one or more accelerometers, gyroscopes, vibration sensors, and/or other motion sensing components, which may be capable of sensing motion magnitude and type for various types of motion.

In 506, the UE may attempt to service the data request. Attempting to service the data request may include attempting to obtain cellular connectivity (e.g., attempting to establish a radio resource control (RRC) connection with a cellular network via a cell of the cellular network), and if cellular connectivity is obtained, exchanging data via the cellular network according to the data request.

As the data request may be a high level request to perform data communication, there may be a variety of possible aspects of fulfilling such a request that may be performed at various operational layers of the UE. For example, the data request may be received from an application layer of the UE by a non-access stratum (NAS) baseband layer of the UE, which may in turn trigger an RRC connection request (e.g., if an RRC connection is not already currently active) by an access stratum (AS) baseband layer of the UE. In order to fulfill the RRC connection request, an RRC layer of the UE (e.g., which may be part of the AS) may attempt to register with a cellular network (e.g., via a cell of the cellular network, which may operate according to any of a variety of radio access technologies or "RATs", if not already registered), and/or if already registered, may attempt a random access procedure (RACH) with the cellular network to establish an RRC connection for mobile originated (MO) data.

If any aspects of the attempt to service the data request are unsuccessful, at least in some instances one or more retries may be performed. For example, if cell registration with a cell is initially unsuccessful, one or more further attempts to perform cell registration may be performed (e.g., using the same cell or a different cell). As another example, if the UE initially unsuccessfully attempts to RACH, the UE may follow up with one or more additional RACH attempts. Such persistence may in many instances eventually lead to connectivity being obtained. However, in some instances it may be the case that service is unavailable at a particular time, or that a particular cell and/or RAT is unavailable at a particular time, or that a particular cell is loaded (congested) at a particular time and has a high interference level that results in RACH failures, such that persistently attempting to obtain connectivity indefinitely would serve little purpose and drain power from the UE unnecessarily. Accordingly, in many instances a threshold number of unsuccessful attempts of each of various types of operations may be set, which may trigger one or more types of failures, which may have one or more consequences, if reached.

For example, if a threshold number of unsuccessful RACH attempts is reached, this may result in an RRC connection request failure, may cause barring of the cell on which the threshold number of unsuccessful RACH attempts occurred, and/or may cause disabling of a RAT according to which the cell operates, among various possibilities. If a threshold number of RRC connection failures occur, this may result in failure of the data request itself. If a threshold number of data request (e.g., including data request retries) failures occur, further data requests may be throttled (e.g., not accepted). Note that the consequences/restrictions that may be enforced as a result of unsuccessful connectivity related procedures/attempts may be temporary, and may be removed after a prescribed period of time and/or based on other considerations (e.g., changes in user activity level, motion level, etc.).

The aggressiveness or persistence of the UE's attempt(s) to obtain cellular connectivity and service the data request (and/or other data requests) may depend on the determined current UE conditions. In other words, under some circumstances the UE may more aggressively attempt to obtain cellular connectivity, for example by increasing the threshold numbers which trigger failure events and/or restrictive consequences, and/or by reducing the effects and/or duration of the restrictive consequences of failure events, while under other circumstances the UE may less aggressively attempt to obtain cellular connectivity, for example by decreasing the threshold numbers which trigger failure events and/or restrictive consequences, and/or by increasing the effects and/or duration of the restrictive consequences of failure events. Such dynamic aggression modification may allow the UE to adaptively balance power and performance considerations according to the current circumstances of the UE.

As an example of dynamically modifying the aggressiveness with which the UE attempts to obtain cellular connectivity, one or more connectivity attempt related parameters may be modified depending on the determined current UE conditions, such that one (e.g., more aggressive) set of connectivity related procedures/parameters/algorithms are followed under one set of conditions (e.g., higher battery level and/or user activity level) and another (e.g., less aggressive) set of connectivity related procedures/parameters/algorithms are followed under another (e.g., lower battery level and/or user activity level) set of conditions, for up to as many defined sets of conditions as desired.

The connectivity related procedures/parameters/algorithms that may differ in different conditions may include any or all of a variety of possible connectivity related procedures, parameter, and/or algorithms, which may be used at any of various possible operation layers of the UE.

As one possibility, the parameters that define certain failure conditions at AS and/or NAS layers of the UE's baseband may be modified in different conditions. For example, the threshold number of unsuccessful RACHs that causes a RRC connection request failure may differ depending on which conditions are currently present for the UE. As another example, the threshold number of RRC connection request failures that causes an application data request failure may differ depending on which conditions are currently present for the UE.

As another possibility, the threshold numbers of certain types of failures that cause connectivity related restrictions to be enforced may be modified in different conditions. For example, a threshold number of cell registration failures that causes disabling of use of one or more RATs and/or that causes cell barring may differ depending on which conditions are currently present for the UE. As another example, a threshold number of application data request failures that causes application data attempt throttling may differ depending on which conditions are currently present for the UE.

As still another possibility, the severity of connectivity related restrictions that may be enforced, if triggered, may be modified in different conditions. For example, a length of time for which application data attempt throttling is enforced, if triggered, or a length of time for which use of one or more RATs is disabled, if triggered, or a length of time for which cell barring occurs, if triggered, may be modified in different conditions. As another example, a type of cell barring which occurs, if triggered, may be modified in different conditions.

Thus, a certain set of connectivity related procedures and parameters may be selected for the UE according to the current UE conditions. As one possibility, a first set of connectivity related procedures/parameters may be selected if one or more predetermined conditions are not present, while a second set of connectivity related procedures/parameters may be selected if the one or more predetermined conditions are present. The UE may proceed to attempt to service the data request using the connectivity related procedures and parameters selected based on the conditions currently present at the UE.

Figure 6:
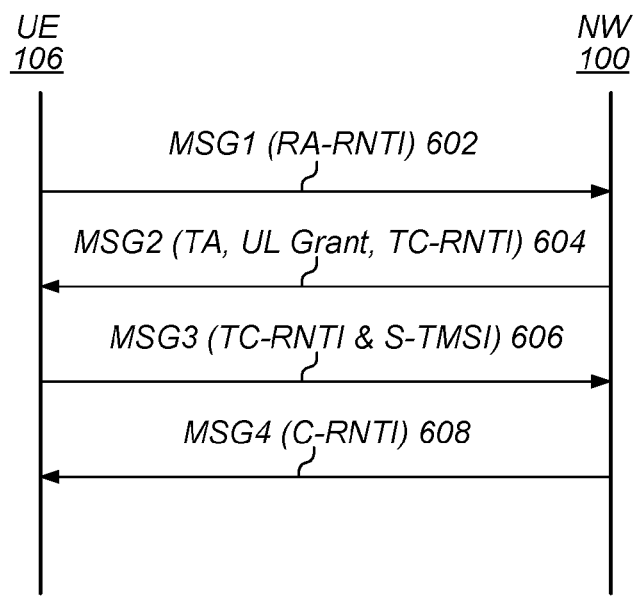
FIG. 6 is a signal flow diagram illustrating an exemplary RACH procedure, according to some embodiments.

FIG. 6—Exemplary RACH Procedure

FIG. 6 is a signal flow diagram illustrating an exemplary idle-mode RACH procedure such as might be performed between a UE 106 and a network 100 according to LTE. It should be noted while the exemplary details illustrated in and described with respect to FIG. 6 may be representative of one possible connected mode transition procedure technique, other techniques for transitioning from idle to connected mode (e.g., according to other RATs) are also possible. Accordingly, the features of FIG. 6 are not intended to be limiting to the disclosure as a whole: numerous variations and alternatives to the details provided herein below are possible and should be considered within the scope of the disclosure.

A RACH may be a contention-based procedure for acquiring synchronization and establishing communication channels and/or radio links which provide access to more extensive network resources (e.g., data carrying channels and/or greater uplink/downlink bandwidth). As previously noted, a UE may attempt to RACH in order to obtain an RRC connection, which may in turn be used to service an application data request, at least as one possibility.

As shown, in 602 the UE 106 may transmit a first message to the network 100. The first message ("Msg1") may include a RACH preamble, including a random access radio network temporary identifier (RA-RNTI).

In 604, the UE 106 may receive a second message from the network 100. The second message ("Msg2", also referred to as "random access response" or "RAR") may include a timing advance (TA) parameter, a temporary cell radio network temporary identifier (TC-RNTI), and an uplink grant for transmitting a third message.

In 606, the UE 106 may transmit the third message to the network 100. The third message ("Msg3", also referred to as "RRC connection request") may include the TC-RNTI and a system architecture evolution temporary mobile subscriber identity (S-TMSI) to identify the UE 106 to the network 100.

In 608, the UE 106 may receive a fourth message from the network 100. The fourth message ("Msg4" or "contention resolution message") may promote the TC-RNTI to a cell radio network temporary identifier (C-RNTI). The C-RNTI may be used for subsequent connected-mode RACH attempts, among various uses, as desired.

Upon completion of the four message sequence, the UE 106 may be in a connected mode (e.g., RRC_connected) with the network 100, and may perform network data exchange via its serving cell.

FIGS. 7-12—Exemplary Connection Attempt Procedure

FIGS. 7-12 illustrate various aspects of an exemplary connection attempt procedure whose parameters may be dynamically modified to adjust the aggressiveness with which connectivity is pursued under different conditions. FIGS. 7-12 and the information provided herein below in conjunction therewith are provided by way of example of various considerations and details relating to possible systems with which the method of FIG. 5 may be implemented, and are not intended to be limiting to the disclosure as a whole. Numerous variations and alternatives to the details provided herein below are possible and should be considered within the scope of the disclosure.

Figure 7:
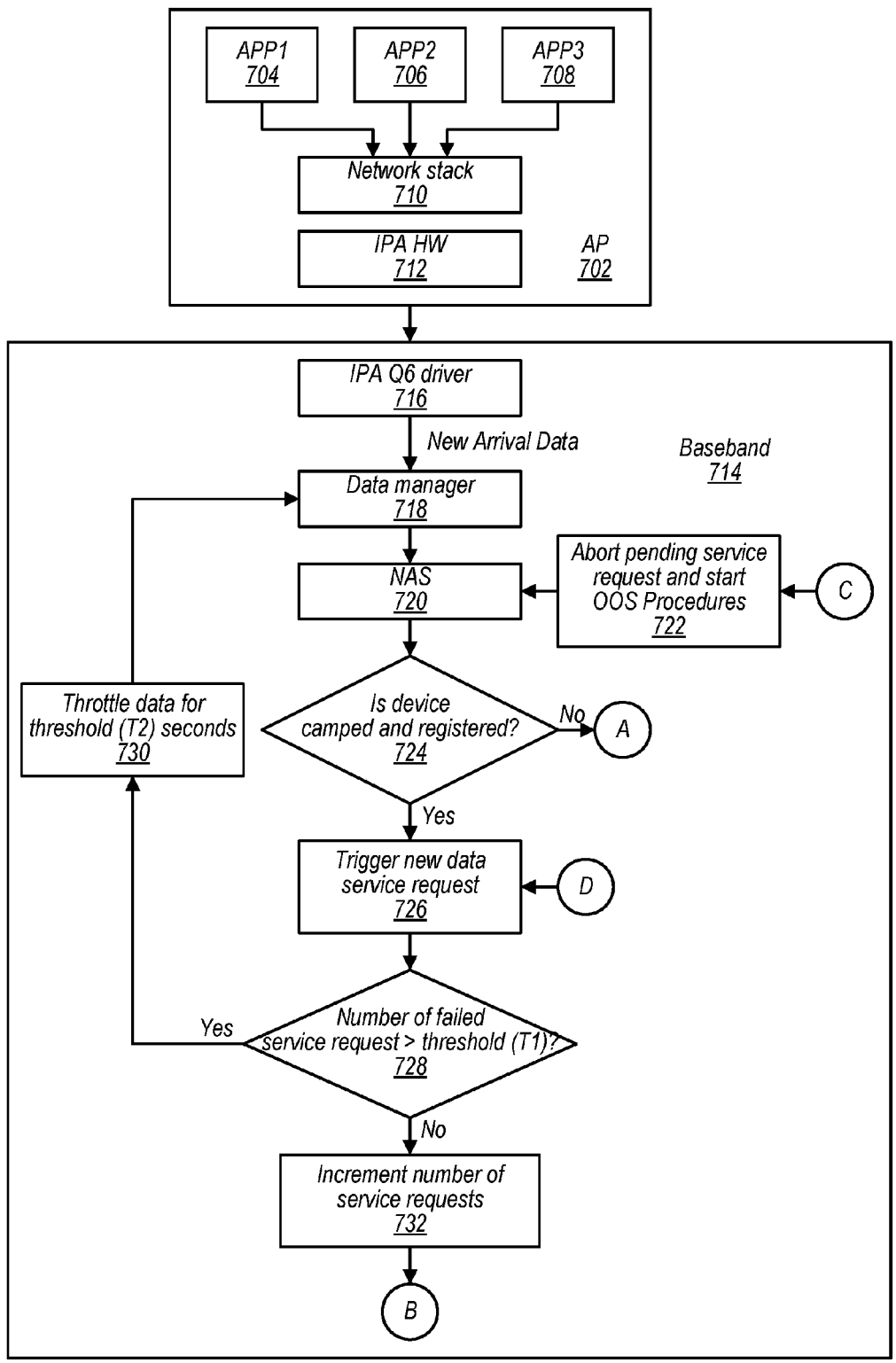

FIG. 7 illustrates an example data flow relating to an application data request from an application processor (AP) 702 to a baseband processor (BB) 714 of a wireless device, according to some embodiments. As shown, one or more applications (e.g., APP1 704, APP2 706, APP 3 708, etc.) may be executing on the AP 704. One or more of these apps may provide data requests to a network stack 710 of the AP 702. The data request(s) may be provided from the network stack 710 of the AP 702 to a data manager 718 of the BB 714 by way of a hardware interface between the AP 702 and the BB 714, which may include internet packet accelerator (IPA) hardware 712 and IPA Q6 driver 716.

The data manager 718 may provide the data to the NAS 720 of the BB 714, which may determine if the device is camped and registered (724). If the wireless device is not camped and registered, an RRC registration procedure (such as illustrated in and described with respect to FIG. 8) may be performed.

If the wireless device is camped and registered, a new data service request may be triggered (726). It may then be determined if a number of failed service requests is greater than a service request failure threshold ("T1") (728). If the number of failed service requests is greater than the service request failure threshold, application data may be throttled for a application data throttling threshold ("T2") number of seconds (730). Upon expiration of the application data throttling threshold number of seconds, the data manager 718 may be informed and application data throttling may no longer be in effect.

If the number of failed service requests is not greater than the service request failure threshold, the number of service requests may be incremented (732), and an RRC procedure for a data request (such as illustrated in and described with respect to FIG. 9) may be performed.

In certain circumstances (e.g., during an RRC registration attempt, or as part of an out-of-service monitoring algorithm), the wireless device may determine that it is out-of-service (OOS). Some such possible circumstances are illustrated in and described with respect to FIGS. 8 and 10. In such instances, any pending service request(s) may be aborted and OOS procedures may be initiated (722).

Additionally, under certain circumstances an RRC procedure for a data request may fail a sufficient number of times to trigger a data service request failure. Some such possible circumstances are illustrated in and described with respect to FIG. 9. In such instances, a new (e.g., retry) data service request may be triggered (726).

Figure 8A:
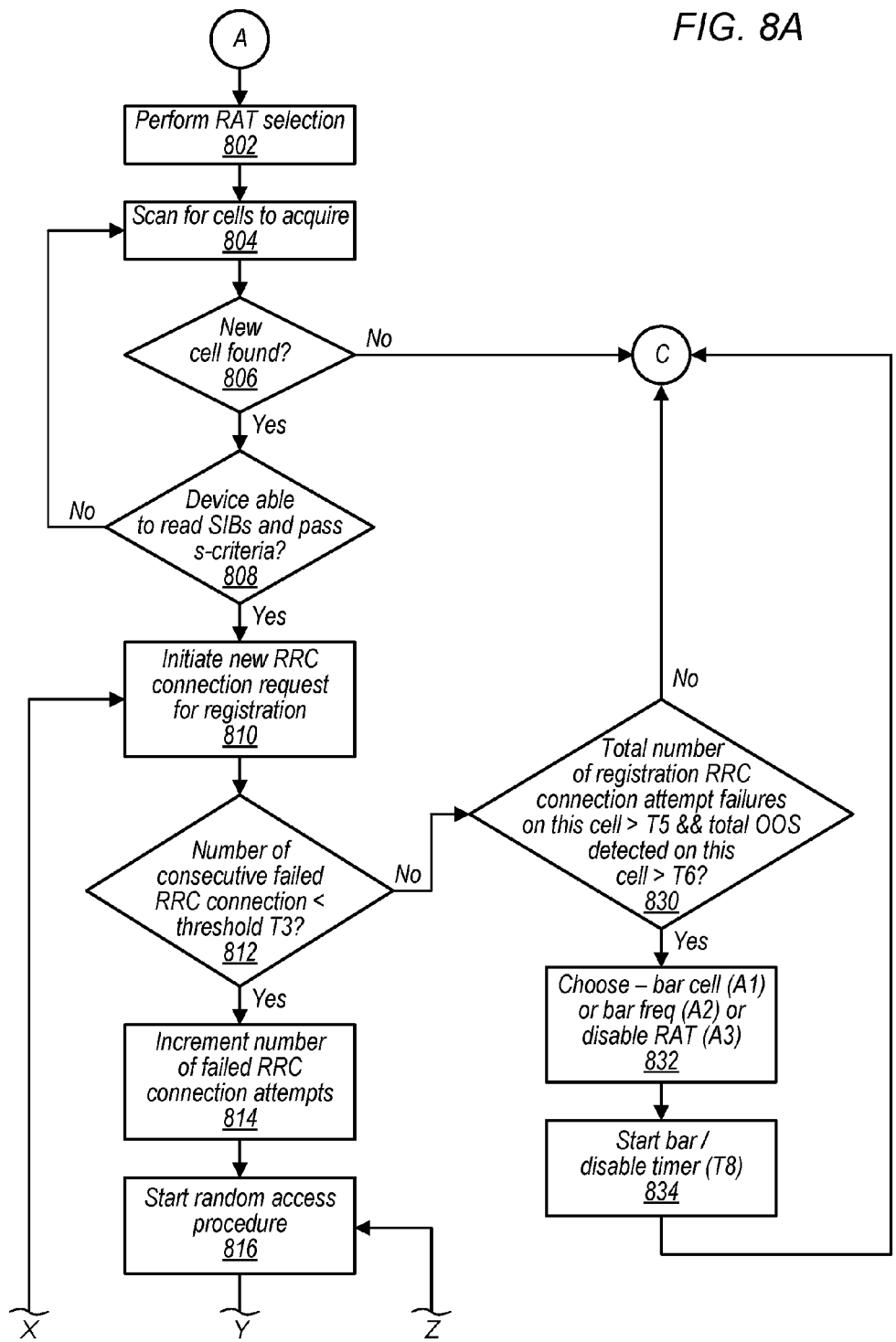
Figure 8B:
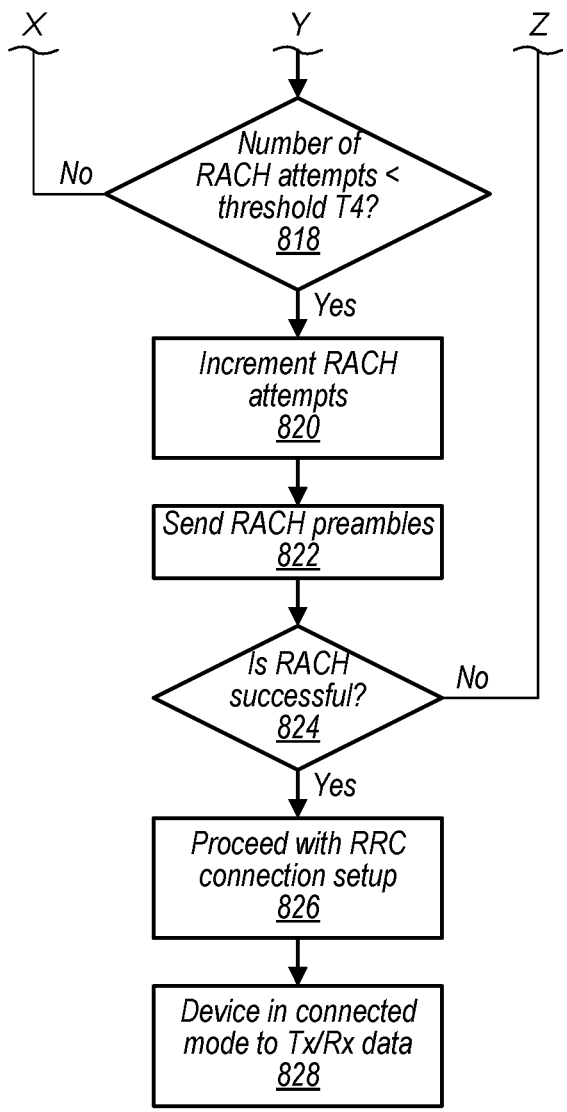

As noted herein above, FIGS. 8A-8B illustrate an example RRC procedure for registration that may be performed by a wireless device, according to some embodiments. As shown, in 802, RAT selection may be performed. In 804, the wireless device may scan for cells (e.g., that operate according to the selected RAT) to potentially acquire.

In 806, it may be determined if a new cell has been found as a result of scanning for cells. If no cells are found, the wireless device may determine that it is OOS, and may initiate NAS OOS procedures (such as illustrated in and described with respect to FIG. 7).

In 808, if a cell (or cells) is (are) found, it may be determined if the device is able to read the system information (e.g., SIBs) and if the cell passes certain criteria (e.g., s-criteria). If the device is unable to read the system information or the cell does not pass the criteria, the wireless device may scan further for cells to potentially acquire (804).

In 810, if the device is able to read the system information and if the cell passes the criteria, a new RRC connection request for registration may be initiated.

In 812, it may be determined if a number of consecutive failed RRC connection attempts is less than a consecutive RRC connection attempt failure threshold ("T3").

In 814, if the number of consecutive failed RRC connection attempts is less than the RRC connection attempt failure threshold, the number of failed RRC connection attempts may be incremented (814), and a random access procedure (RACH) on the cell may be initiated (816).

In 818, it may be determined if a number of failed RACH attempts on the cell is less than a registration RACH attempt failure threshold ("T4"). If the number of failed RACH attempts on the cell is not less than the registration RACH attempt failure threshold, the RRC connection attempt may be determined to have failed and a new RRC connection request for registration may be initiated (810).

If the number of failed registration RACH attempts on the cell is less than the registration RACH attempt failure threshold, the number of failed registration RACH attempts may be incremented (820), and RACH preamble(s) may be sent (822). It may be determined if the RACH is successful (824), and if so the wireless device may proceed with RRC connection setup (826), following which the device may be in connected mode and may transmit and/or receive data (828). If the RACH is unsuccessful, another (e.g., retry) RACH procedure may be initiated (816).

It at some point the number of consecutive failed RRC connection attempts is not less than the consecutive RRC connection attempt failure threshold, it may be determined if the total number of registration RRC connection attempt failures on the cell is greater than a per-cell total RRC connection attempt failure threshold ("T5") and if the total number of OOS occurrences on the cell is greater than a cell-specific OOS declaration threshold ("T6") (830).

If the total number of registration RRC connection attempt failures on the cell is greater than the per-cell total RRC connection attempt failure threshold and if the total number of OOS occurrences on the cell is greater than the cell-specific OOS declaration threshold, a choice may be made between barring the cell ("A1"), barring the frequency on which the cell is deployed ("A2"), or disabling the RAT according to which the cell operates ("A3") (832). A bar/disable timer ("T8") may be initiated (834); after expiration of the bar/disable timer, the barring or disabling may be lifted and the wireless device may proceed to initiate NAS OOS procedures (such as illustrated in and described with respect to FIG. 7). Likewise if the total number of registration RRC connection attempt failures on the cell is not greater than the per-cell total RRC connection attempt failure threshold or if the total number of OOS occurrences on the cell is not greater than the cell-specific OOS declaration threshold, the wireless device may proceed to initiate NAS OOS procedures.

Figure 9:
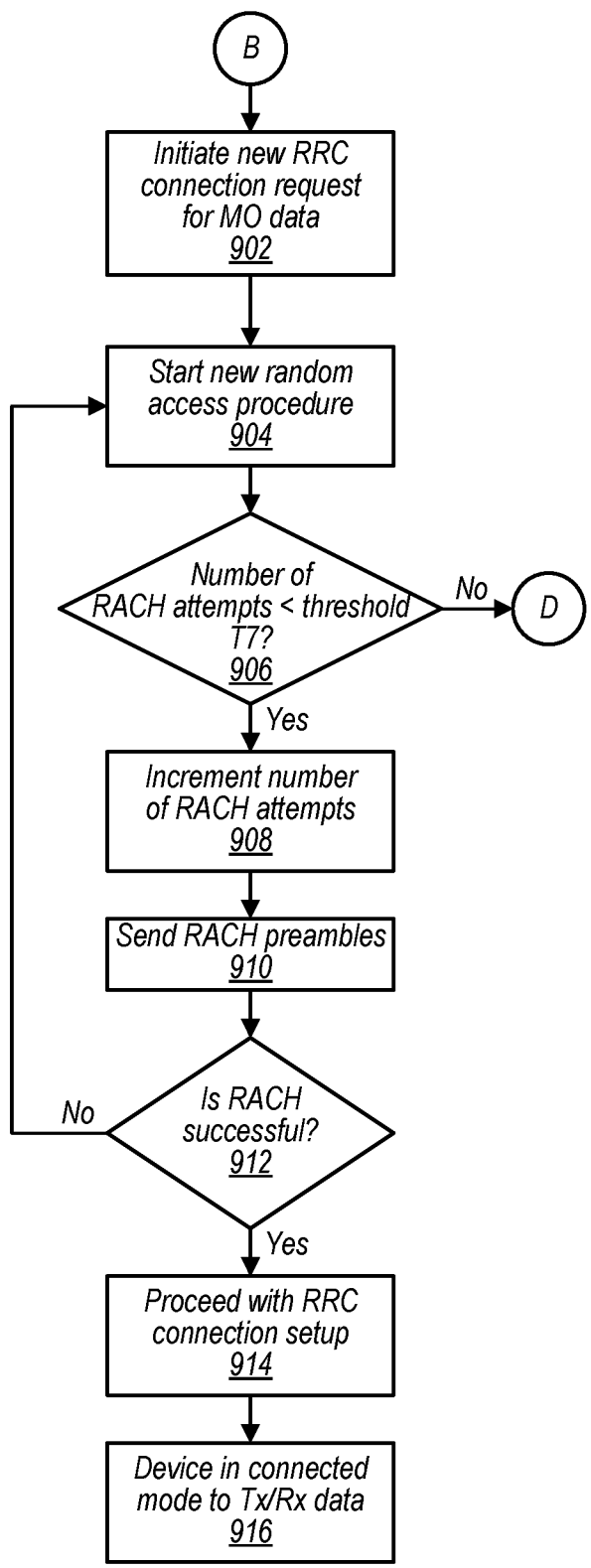

As noted herein above, FIG. 9 illustrates an example RRC procedure for a data request, e.g., if the wireless device is already registered and camped on a cell, according to some embodiments. The RRC procedure in such a case may transition the wireless device from an RRC idle mode to an RRC connected mode, in which data exchange may occur.

As shown, in 902, a new RRC connection request for mobile originated (MO) data may be initiated. A new RACH procedure may be initiated (904), and it may be determined if a number of failed RACH attempts on the cell is less than a MO data RACH attempt failure threshold ("T7") (906).

If the number of failed MO data RACH attempts on the cell is less than the MO data RACH attempt failure threshold, the number of failed MO data RACH attempts may be incremented (908), and RACH preamble(s) may be sent (910). It may be determined if the RACH is successful (912), and if so the wireless device may proceed with RRC connection setup (914), following which the device may be in connected mode and may transmit and/or receive data (916). If the RACH is unsuccessful, another (e.g., retry) RACH procedure may be initiated (904).

If the number of failed MO data RACH attempts on the cell is not less than the MO data RACH attempt failure threshold, this may trigger a data service request failure and trigger a new (e.g., retry) data service request, such as illustrated in and described with respect to FIG. 7.

Figure 10:
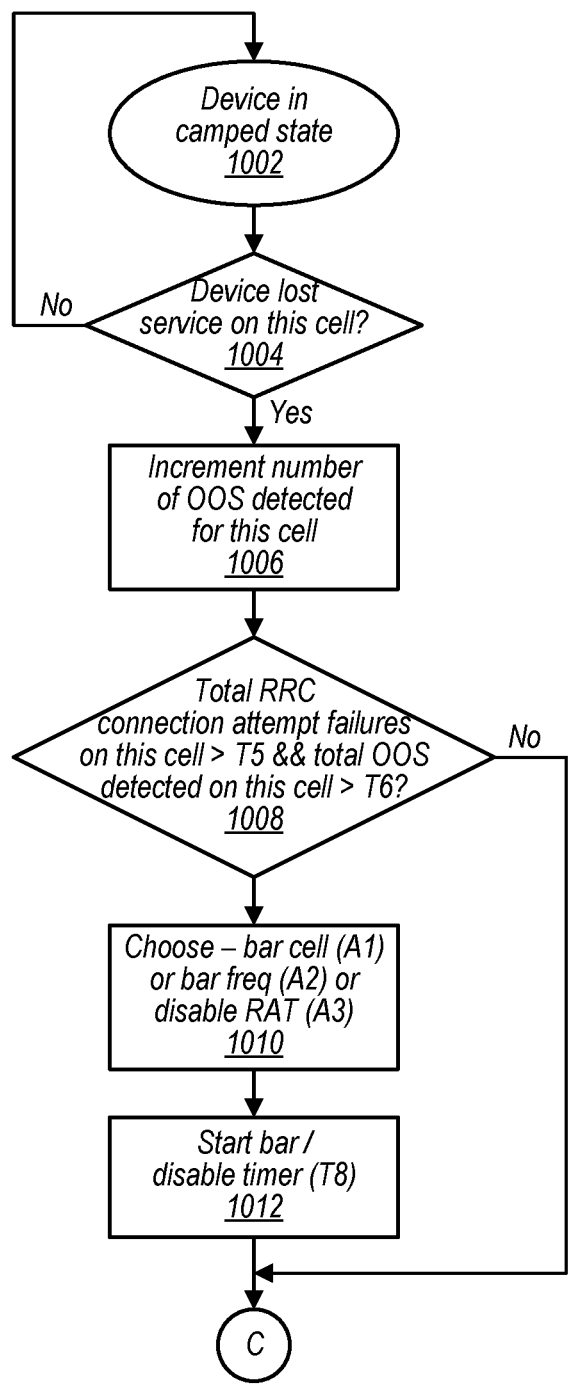

As noted herein above, FIG. 10 illustrates an example OOS monitoring algorithm for a cell, according to some embodiments. As shown, in 1002, the device may be in a camped state with respect to a cell. In 1004 it may be determined if the device has lost service on the cell. If not, the device may remain the in the camped state. If the device has lost service on the cell, the number of OOS occurrences detected for the cell may be incremented (1006), and it may be determined if the total number of registration RRC connection attempt failures on the cell is greater than the per-cell total RRC connection attempt failure threshold and if the total number of OOS occurrences on the cell is greater than the cell-specific OOS declaration threshold (1008).

If the total number of registration RRC connection attempt failures on the cell is greater than the per-cell total RRC connection attempt failure threshold and if the total number of OOS occurrences on the cell is greater than the cell-specific OOS declaration threshold, a choice may be made between barring the cell, barring the frequency on which the cell is deployed, or disabling the RAT according to which the cell operates (1010). In this case, the bar/disable timer may be initiated (1012); after expiration of the bar/disable timer, the barring or disabling may be lifted and the wireless device may proceed to initiate NAS OOS procedures (such as illustrated in and described with respect to FIG. 7). Likewise if the total number of registration RRC connection attempt failures on the cell is not greater than the per-cell total RRC connection attempt failure threshold or if the total number of OOS occurrences on the cell is not greater than the cell-specific OOS declaration threshold, the wireless device may proceed to initiate NAS OOS procedures.

Figure 11:
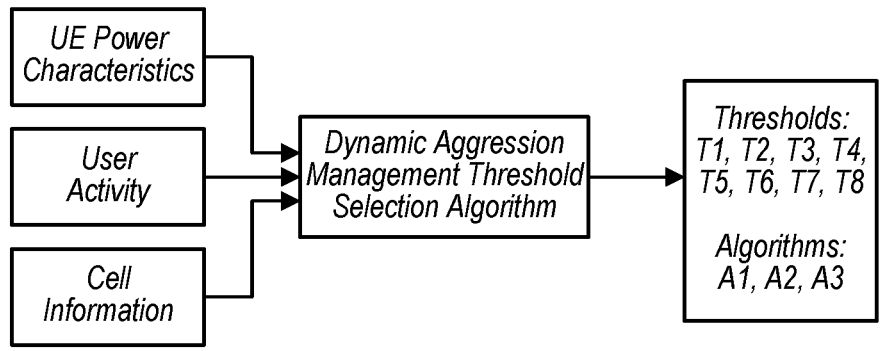

FIG. 11 illustrates an example process for determining various connection attempt parameter values to use in conjunction with the exemplary procedures of FIGS. 7-10, according to some embodiments. As shown, any or all of certain UE power characteristics, user activity indicators, and cell information relating to a current serving cell may be provided as inputs to a dynamic aggression management threshold selection algorithm. Based on the provided inputs, the algorithm may determine the values of the various parameters and/or the algorithms/techniques used as part of various connection attempt procedures such as to balance power and performance considerations.

As shown, the UE power characteristics that may be considered to determine the various parameters and/or the algorithms/techniques used as part of various connection attempt procedures may include any or all of a battery level of the UE, channel conditions experienced by the UE (e.g., which may affect transmit power requirements, and hence affect battery levels), device thermal conditions, and/or uplink interference/network congestion experienced by the UE, among various possible UE power characteristics.

Similarly as shown, the user activity indicators that may be considered to determine the various parameters and/or the algorithms/techniques used as part of various connection attempt procedures may include any or all of whether a screen of the UE is on or off, whether the UE is stationary or moving, and/or whether foreground and/or background application data is currently active, among various possible user activity indicators.

As further shown, the cell information that may be considered to determine the various parameters and/or the algorithms/techniques used as part of various connection attempt procedures may include any or all of a public land mobile network of the cell, a cell identifier (cell ID) of the cell, and/or a radio access technology according to which the cell operates, among various possible types of cell information.

The threshold and/or timer parameters for which values may be selected and the algorithms that may be selected according to the dynamic aggression management threshold selection algorithm may include any of the various thresholds and/or algorithms previously described with respect to FIGS. 7-10, which are also illustrated and further described with respect to FIG. 12.

FIG. 12 is a table illustrating various possible threshold types and value ranges that may be used by a dynamic aggression management threshold selection algorithm such as illustrated in and described with respect to FIG. 11 and in conjunction with any or all of the procedures illustrated in and described with respect to FIGS. 7-10.

As shown, the thresholds may include "T1", number of failed data service requests (e.g., $1 \leq T1 \leq 5$); "T2", time to throttle data requests in seconds (e.g., $720 \leq T2 \leq 1440$ s); "T3", number of failed consecutive RRC connection attempts for registration purposes (e.g., attach, location area update (LAU), tracking area update (TAU), etc.) (e.g., $2 \leq T3 \leq 6$); "T4", number of failed RACH preamble cycles or RACH attempts at MAC layer for one RRC connection request with cause=registration (e.g., $1 \leq T4 \leq 12$); "T5", total number of RRC connection attempt failures seen per cell (e.g., $12 \leq T5 \leq 48$); "T6", number of times OOS declared per cell (e.g., $1 \leq T6 \leq 4$); "T7", number of failed RACH preamble cycles or RACH attempts at MAC layer for one RRC connection request with cause=MO data (e.g., $1 \leq T7 \leq 12$); and "T8", bar timer used based on the type of algorithm chosen (e.g., A1, A2, or A3) (e.g., $720 \leq T8 \leq 1440$ s).

As also shown, the algorithms may include "A1", in which a cell identified by its unique global cell ID is barred; "A2", in which a cell frequency identified by absolute radio frequency channel number (ARFCN, e.g., UMTS ARFCN or UARFCN for UMTS/evolved ARFCN or EARFCN for LTE) is barred; and "A3", in which the current radio access technology is disabled.

Figure 13:
FIGS. 13-14 are tables illustrating how barring individual cells and barring cell frequencies can functionally differ in an exemplary scenario, according to some embodiments.
Figure 14:

FIGS. 13-14—Exemplary Cell Barring Techniques

As previously noted, RACHing may be a power consuming process for a UE, particularly in poor radio frequency (RF) conditions, as the UE may utilize high transmit power in such circumstances, which may more quickly drain the battery of the UE. For example, in poor service conditions in which a UE "ping pongs" between out-of-service and in-service (attempting to register on any cell), the UE may end up frequently and possibly continuously RACHing, potentially at increasingly higher transmit power levels, for an extended period of time, which may quickly drain the battery of the UE.

As also previously noted, in order to avoid such scenarios, at least in some instances a UE may implement a cell barring algorithm. According to such an algorithm, the number of RACH attempts for registering with a cell and also the number of times the UE goes out-of-service on each cell may be monitored, and upon reaching a certain threshold number of registration RACH attempts and/or out-of-service occurrences, a cell may be barred for a certain period of time. Such cell barring may be performed on a individual cell basis, as one possibility, or may be performed on a cell frequency basis, as another possibility.

FIGS. 13-14 are tables illustrating how barring individual cells and barring cell frequencies can functionally differ in an exemplary scenario, according to some embodiments. FIGS. 13-14 and the information provided herein below in conjunction therewith are provided by way of example of various considerations and details relating to possible systems with which the method of FIG. 5 may be implemented, and are not intended to be limiting to the disclosure as a whole. Numerous variations and alternatives to the details provided herein below are possible and should be considered within the scope of the disclosure.

Barring cell frequencies may potentially occur more quickly (e.g., have a lower triggering threshold) and be more restrictive than barring individual cells, for example when multiple cells are deployed on the same frequency, at least in some instances. According to the exemplary scenario of FIGS. 13-14, a UE may discover nine UMTS cells at a particular time, including four cells on frequency 4360 in band V, three cells on frequency 4385 in band V, and two cells on frequency 612 in band II. Each such cell may be distinguished by a primary scrambling code (PSC), which may function as a local identifier for the cell.

As shown in FIG. 13, if cell barring is implemented on an individual cell basis, each of the nine cells must individually meet the RRC failure and OOS failure thresholds to be barred, and if such thresholds are met by one of the nine cells, that cell may individually be barred with no effect on the other cells deployed on the same frequency.

In contrast, as shown in FIG. 14, if cell barring is implemented on an cell frequency basis, all of the cells deployed on a given frequency may contribute to the RRC failure and OOS failure thresholds for the frequency on which they are deployed, and if such thresholds are met for a particular cell frequency, all of the cells deployed on that frequency may be barred.

Barring cells individually may provide less power conservation than barring cell frequencies, at least in some instances. For example, in a location with multiple cells, such as in the scenario of FIGS. 13-14, since the UE may screen every available cell individually, by the time the UE has screened the last available cell, the bar timer for first cell that was barred may expire and the first cell may be unbarred. This may repeat such that the UE may continue to cycle through the cells indefinitely and may not obtain any power conservation benefits from such cell barring. If, in contrast, a particular cell frequency (UTRA Absolute Radio Frequency Channel Number or UARFCN) is barred, all the cells that belong to that particular UARFCN may be barred, which may reduce the number of RRC Attempts and help save more power as compared to individual cell barring, at least in some scenarios.

Thus, cell barring on an individual cell basis and cell frequency barring may provide different levels of tolerance for cell registration RACH failures. Depending on a desired level of aggressiveness with which connectivity is to be pursued, each may be appropriate at certain times. For example, as one possibility, under conditions when connectivity is more aggressively pursued (such as when user activity and/or battery levels are high), cell barring may be implemented on an individual cell basis (e.g., to improve the chances of obtaining connectivity), while under conditions when connectivity is less aggressively pursued (such as when user activity and/or battery levels are low), cell barring may be implemented on a cell frequency basis (e.g., to reduce power consumption).

In addition or as alternatives to selecting whether to perform cell barring on an individual cell or cell frequency basis, as previously noted with respect to FIG. 5, any number of connectivity related procedures and/or parameters may be modified as part of dynamically modifying aggressiveness. The following are further specific examples of possible modifications to connectivity related procedures and/or parameters that may be dynamically implemented depending on current UE conditions, which are not intended to be limiting to the disclosure as a whole. Numerous variations and alternatives to the details provided herein below are possible and should be considered within the scope of the disclosure.

As one possibility, under a first set of conditions (e.g., in a 'normal power mode') five LTE registration failures (e.g., any of tracking area update, attach, location area update, or inter-RAT procedures) may trigger disabling of LTE for a UE for 12 minutes. Under a second set of conditions (e.g., in a 'low power mode'), three LTE registration failures may trigger disabling of LTE for the UE for 15 minutes.

As another possibility, in the normal power mode a UMTS (WCDMA or TD-SCDMA) cell may be barred (on an individual basis) for 12 minutes if 96 RRC connection failures or 2 iRAT failures or service lost on the cell plus 24 RRC connection failures occur if the UE is stationary and the UE screen is off. In the low power mode, a UMTS frequency may be barred for 12 minutes if 24 RRC connection failures or 1 iRAT failure or service lost on the cell plus 12 RRC connection failures occur to any cell or combination of cells on the frequency.

As still another possibility, one or more RACH related thresholds may be cut in half in low power mode relative to normal power mode for RRC connection requests or cell update requests. The RACH related thresholds may include N300, N302, MMAX, and/or any of various thresholds. For example, the RACH failure threshold for RRC connection request failure may be reduced from 20 RACH failures in the normal power mode to 10 RACH failures in the low power mode. As another possibility, the RRC connection requests failure threshold for application data request failure may be reduced from 6 RRC connection request failures in the normal power mode to 3 RRC connection request failures in the low power mode.

As a still further possibility, in the normal power mode, 5 mobile originated (e.g., background) application data/service request failures may trigger throttling of further application data attempts for 15 minutes in stationary conditions. In the low power mode, 3 application data/service request failures may trigger throttling of further application data attempts for 20 minutes in stationary or semi-stationary conditions.

In the following further exemplary embodiments are provided.

One set of embodiments may include a method, comprising: by a wireless user equipment (UE) device: monitoring whether one or more predetermined conditions are present; attempting to establish a cellular connection according to a first set of connectivity related procedures if the one or more predetermined conditions are not present; and attempting to establish a cellular connection according to a second set of connectivity related procedures if the one or more predetermined conditions are present, wherein one or more connectivity related parameters differ between the first set of connectivity related procedures and the second set of connectivity related procedures.

According to some embodiments, cell registration failures trigger cell barring if the one or more predetermined conditions are not present, wherein cell registration failures trigger frequency barring if the one or more predetermined conditions are present.

According to some embodiments, a first predetermined number of cell registration failures according to a radio access technology (RAT) triggers disabling of the RAT for a first predetermined amount of time if the one or more predetermined conditions are not present, wherein a second predetermined number of cell registration failures according to the RAT triggers disabling of the RAT for a second predetermined amount of time if the one or more predetermined conditions are present.

According to some embodiments, a first predetermined number of service request failures triggers throttling of application data attempts for a first predetermined amount of time if the one or more predetermined conditions are not present, wherein a second predetermined number of service request failures triggers throttling of application data attempts for a second predetermined amount of time if the one or more predetermined conditions are present.

According to some embodiments, one or more service request failure related thresholds differ between the first set of connectivity related procedures and the second set of connectivity related procedures.

According to some embodiments, the one or more predetermined conditions comprise one or more of: a battery level of the UE being below a battery level threshold; a user activity level of the UE being below a user activity threshold; or a motion level of the UE being below a motion level threshold.

According to some embodiments, the first set of connectivity related procedures correspond to more aggressive pursuit of cellular connectivity than the second set of connectivity related procedures.

A further set of embodiments may include a wireless user equipment (UE) device, comprising: a radio; and a processing element operably coupled to the radio; wherein the radio and the processing element are configured to: receive an application data request from an application layer of the UE; and attempt to establish a cellular connection to service the application data request according to a plurality of connection attempt parameters, wherein at least one of the connection attempt parameters are modified under one or more predetermined conditions, wherein the one or more predetermined conditions comprise at least a battery level of the UE being below a battery level threshold, wherein connection attempt parameters modified under the one or more predetermined conditions comprise one or more of: whether to bar cell frequencies or individual cells based on cell registration failures for cells of one or more radio access technologies (RATs); a cell registration failure threshold for disabling use of one or more RATs and/or a length of time for disabling use of the one or more RATs if the cell registration failure threshold is met; application data request throttling threshold and/or length parameters; or one or more application data request failure threshold parameters.

According to some embodiments, the one or more predetermined conditions further comprise a user activity level of the UE being below a user activity threshold.

According to some embodiments, the one or more predetermined conditions further comprise a motion level of UE being below a motion threshold.

According to some embodiments, the at least one of the connection attempt parameters are modified to cause the UE to less aggressively pursue cellular connectivity under the one or more predetermined conditions.

A still further set of embodiments may include a non-transitory computer accessible memory medium, comprising program instructions which, when executed at a wireless user equipment (UE) device, cause the UE device to: determine one or more conditions currently present for the UE, wherein the one or more conditions comprise at least a battery level condition of the UE; select whether to implement cell barring on an individual cell basis or a cell frequency basis based at least in part on the one or more conditions determined to be currently present for the UE; and perform cell barring according to the selection of whether to implement cell barring on an individual cell basis or a cell frequency basis.

According to some embodiments, cell barring is implemented for UMTS cells.

According to some embodiments, when executed, the program instructions further cause the UE device to: select to implement cell barring on an individual cell basis under a first set of conditions in which the battery level condition of the UE is above a battery level threshold; and select to implement cell barring on a cell frequency basis under a second set of conditions in which the battery level condition of the UE is below the battery level threshold.

According to some embodiments, when executed, the program instructions further cause the UE device to: select an LTE cell registration failure threshold for disabling LTE based at least in part on the one or more conditions determined to be currently present for the UE; monitor LTE cell registration failures; and disable LTE for a predetermined period of time if the selected LTE cell registration failure threshold is met.

According to some embodiments, the predetermined period of time for which LTE is disabled is also selected based at least in part on the one or more conditions determined to be currently present for the UE.

According to some embodiments, when executed, the program instructions further cause the UE device to: select a service request failure threshold for throttling application data attempts based at least in part on the one or more conditions determined to be currently present for the UE; monitor service request failures; and throttle application data attempts for a predetermined period of time if the selected service request failure threshold is met.

According to some embodiments, the predetermined period of time for which application data attempts are throttled is also selected based at least in part on the one or more conditions determined to be currently present for the UE.

According to some embodiments, when executed, the program instructions further cause the UE device to: select random access procedure (RACH) related thresholds for radio resource control (RRC) connection request or cell update procedures based at least in part on the one or more conditions determined to be currently present for the UE.

According to some embodiments, the one or more conditions further comprise a user activity level of the UE and a motion level of the UE.

An additional exemplary embodiment may include a wireless user equipment (UE) device, comprising: a radio; and an processing element operably coupled to the radio; wherein the UE is configured to implement any or all parts of any of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus for implementation in a wireless user equipment (UE) device, comprising:
one or more processing elements, wherein the one or more processing elements are configured to:
determine one or more conditions currently present for the UE, wherein the one or more conditions comprise at least a battery level condition of the UE;
select whether to implement cell barring on an individual cell basis or a cell frequency basis based at least in part on the one or more conditions determined to be currently present for the UE; and
perform cell barring according to the selection of whether to implement cell barring on an individual cell basis or a cell frequency basis.

2. The apparatus of claim 1, wherein cell barring is implemented for UMTS cells.

3. The apparatus of claim 1, wherein the one or more processing elements are further configured to:
select to implement cell barring on an individual cell basis under a first set of conditions in which the battery level condition of the UE is above a battery level threshold; and
select to implement cell barring on a cell frequency basis under a second set of conditions in which the battery level condition of the UE is below the battery level threshold.

4. The apparatus of claim 1, wherein the one or more processing elements are further configured to:
select an LTE cell registration failure threshold for disabling LTE based at least in part on the one or more conditions determined to be currently present for the UE;
monitor LTE cell registration failures; and
disable LTE for a predetermined period of time if the selected LTE cell registration failure threshold is met.

5. The apparatus of claim 4, wherein the predetermined period of time for which LTE is disabled is also selected based at least in part on the one or more conditions determined to be currently present for the UE.

6. The apparatus of claim 1, wherein the one or more processing elements are further configured to:
select a service request failure threshold for throttling application data attempts based at least in part on the one or more conditions determined to be currently present for the UE;
monitor service request failures; and
throttle application data attempts for a predetermined period of time if the selected service request failure threshold is met.

7. The apparatus of claim 6, wherein the predetermined period of time for which application data attempts are throttled is also selected based at least in part on the one or more conditions determined to be currently present for the UE.

8. The UE of claim 7,
wherein the at least one of the connection attempt parameters are modified to cause the UE to less aggressively pursue cellular connectivity under the one or more predetermined conditions.

9. The apparatus of claim 1, wherein the one or more processing elements are further configured to:
select random access procedure (RACH) related thresholds for radio resource control (RRC) connection request or cell update procedures based at least in part on the one or more conditions determined to be currently present for the UE.

10. The apparatus of claim 1, wherein the one or more conditions further comprise a user activity level of the UE and a motion level of the UE.

11. A method, comprising:
by a wireless user equipment (UE) device:
- determining one or more conditions currently present for the UE, wherein the one or more conditions comprise at least a battery level condition of the UE;
- selecting whether to implement cell barring on an individual cell basis or a cell frequency basis based at least in part on the one or more conditions determined to be currently present for the UE; and
- performing cell barring according to the selection of whether to implement cell barring on an individual cell basis or a cell frequency basis.

12. The method of claim 11, further comprising:
- selecting to implement cell barring on an individual cell basis under a first set of conditions in which the battery level condition of the UE is above a battery level threshold; and
- selecting to implement cell barring on a cell frequency basis under a second set of conditions in which the battery level condition of the UE is below the battery level threshold.

13. The method of claim 11, further comprising:
- select an LTE cell registration failure threshold for disabling LTE based at least in part on the one or more conditions determined to be currently present for the UE;
- monitor LTE cell registration failures; and
- disable LTE for a predetermined period of time if the selected LTE cell registration failure threshold is met.

14. The method of claim 13, wherein the predetermined period of time for which LTE is disabled is also selected based at least in part on the one or more conditions determined to be currently present for the UE.

15. The method of claim 11, further comprising:
- select a service request failure threshold for throttling application data attempts based at least in part on the one or more conditions determined to be currently present for the UE;
- monitor service request failures; and
- throttle application data attempts for a predetermined period of time if the selected service request failure threshold is met.

16. The method of claim 15, wherein the predetermined period of time for which application data attempts are throttled is also selected based at least in part on the one or more conditions determined to be currently present for the UE.

17. The method of claim 11, further comprising:
- select random access procedure (RACH) related thresholds for radio resource control (RRC) connection request or cell update procedures based at least in part on the one or more conditions determined to be currently present for the UE.

18. A wireless user equipment (UE) device, comprising:
a radio; and
a processing element operably coupled to the radio;
wherein the radio and the processing element are configured to:
- receive an application data request from an application layer of the UE; and
- attempt to establish a cellular connection to service the application data request according to a plurality of connection attempt parameters,
- wherein at least one of the connection attempt parameters are modified under one or more predetermined conditions, wherein the one or more predetermined conditions comprise at least a battery level of the UE being below a battery level threshold, wherein connection attempt parameters modified under the one or more predetermined conditions comprise one or more of:
  - whether to bar cell frequencies or individual cells based on cell registration failures for cells of one or more radio access technologies (RATs);
  - a cell registration failure threshold for disabling use of one or more RATs and/or a length of time for disabling use of the one or more RATs if the cell registration failure threshold is met;
  - application data request throttling threshold and/or length parameters; or
  - one or more application data request failure threshold parameters.

19. The UE of claim 18,
wherein the one or more predetermined conditions further comprise a user activity level of the UE being below a user activity threshold.

20. The UE of claim 18,
wherein the one or more predetermined conditions further comprise a motion level of UE being below a motion threshold.

* * * * *